US011899932B2

(12) United States Patent
Au et al.

(10) Patent No.: US 11,899,932 B2
(45) Date of Patent: *Feb. 13, 2024

(54) STORAGE SYSTEM HAVING CROSS NODE DATA REDUNDANCY AND METHOD AND COMPUTER READABLE MEDIUM FOR SAME

(71) Applicant: NEC CORPORATION, Tokyo (JP)

(72) Inventors: Wing-Yee Au, Saratoga, CA (US); Alan Rowe, San Jose, CA (US)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,156

(22) Filed: Mar. 17, 2023

(65) Prior Publication Data

US 2023/0280901 A1  Sep. 7, 2023

Related U.S. Application Data

(63) Continuation of application No. 17/534,310, filed on Nov. 23, 2021, now abandoned, which is a continuation of application No. 16/788,250, filed on Feb. 11, 2020, now Pat. No. 11,182,075, which is a continuation of application No. 16/154,967, filed on Oct. 9, 2018, now Pat. No. 10,558,361, which is a
(Continued)

(51) Int. Cl.
| | |
|---|---|
| *G06F 12/00* | (2006.01) |
| *G06F 3/06* | (2006.01) |
| *G06F 11/10* | (2006.01) |
| *G06F 11/20* | (2006.01) |
| *G06F 11/14* | (2006.01) |

(52) U.S. Cl.
CPC ........... *G06F 3/0604* (2013.01); *G06F 3/065* (2013.01); *G06F 3/067* (2013.01); *G06F 3/0617* (2013.01); *G06F 3/0619* (2013.01); *G06F 3/0629* (2013.01); *G06F 3/0631* (2013.01); *G06F 3/0635* (2013.01); *G06F 3/0647* (2013.01); *G06F 3/0689* (2013.01); *G06F 11/1092* (2013.01); *G06F 11/1464* (2013.01); *G06F 11/1469* (2013.01); *G06F 11/2094* (2013.01); *G06F 3/0673* (2013.01); *G06F 2201/805* (2013.01); *G06F 2201/82* (2013.01); *G06F 2211/1028* (2013.01)

(58) Field of Classification Search
CPC .... G06F 3/0604; G06F 3/0617; G06F 3/0619; G06F 3/0629; G06F 3/0631; G06F 3/0635; G06F 3/0647; G06F 3/065; G06F 3/067; G06F 3/0689; G06F 11/1092; G06F 11/1464; G06F 11/1469; G06F 11/2094; G06F 3/0673; G06F 2201/805; G06F 2201/82; G06F 2211/1028
See application file for complete search history.

(56) References Cited

U.S. PATENT DOCUMENTS

| | | |
|---|---|---|
| 5,278,838 A | 11/1994 | Ng et al. |
| 5,412,791 A | 5/1995 | Martin et al. |
| (Continued) | | |

*Primary Examiner* — John A Lane
(74) *Attorney, Agent, or Firm* — Sughrue Mion, PLLC

(57) ABSTRACT

Embodiments of the present invention generally provide for multi-dimensional disk arrays and methods for managing same and can be used in video surveillance systems for the management of real-time video data, image data, or combinations thereof.

20 Claims, 9 Drawing Sheets

Related U.S. Application Data continuation of application No. 15/715,404, filed on Sep. 26, 2017, now Pat. No. 10,095,409, which is a continuation of application No. 15/471,020, filed on Mar. 28, 2017, now Pat. No. 9,772,774, which is a continuation of application No. 15/266,083, filed on Sep. 15, 2016, now Pat. No. 9,606,883, which is a continuation of application No. 15/013,622, filed on Feb. 2, 2016, now Pat. No. 9,448,734, which is a continuation of application No. 14/686,579, filed on Apr. 14, 2015, now Pat. No. 9,250,807, which is a continuation of application No. 14/329,398, filed on Jul. 11, 2014, now Pat. No. 9,032,149, which is a continuation of application No. 13/270,030, filed on Oct. 10, 2011, now Pat. No. 8,782,339.

(60) Provisional application No. 61/391,962, filed on Oct. 11, 2010.

(56) References Cited

U.S. PATENT DOCUMENTS

| | | |
|---|---|---|
| RE36,846 E | 8/2000 | Ng et al. |
| 6,542,961 B1 | 4/2003 | Matsunami et al. |
| 6,789,173 B1 | 9/2004 | Tanaka et al. |
| 6,877,029 B1 | 4/2005 | Kuskin |
| 7,117,291 B2 | 10/2006 | Mattausch |
| 7,353,340 B2 | 4/2008 | Hetherington et al. |
| 7,529,890 B1 | 5/2009 | Neuman et al. |
| 7,809,979 B2 | 10/2010 | Mochizuki et al. |
| 7,941,627 B2 | 5/2011 | Arimilli et al. |
| 8,327,080 B1 * | 12/2012 | Der .................. G06F 12/0804 711/143 |
| 8,495,417 B2 | 7/2013 | Jernigan, IV et al. |
| 2003/0163757 A1 | 8/2003 | Kang et al. |
| 2003/0200390 A1 | 10/2003 | Moore et al. |
| 2004/0177218 A1 | 9/2004 | Meehan et al. |
| 2006/0041793 A1 | 2/2006 | Cherian et al. |
| 2006/0112302 A1 | 5/2006 | Cherian |
| 2010/0106907 A1 | 4/2010 | Noguchi et al. |
| 2010/0169688 A1 | 7/2010 | Suzuki |

\* cited by examiner

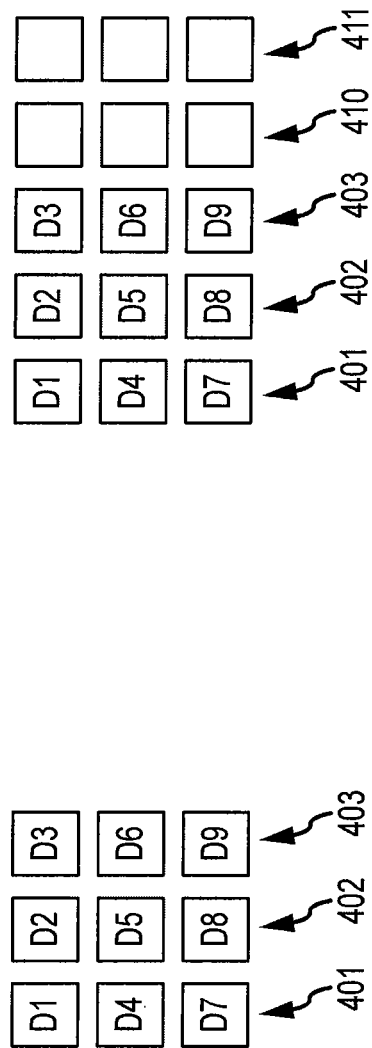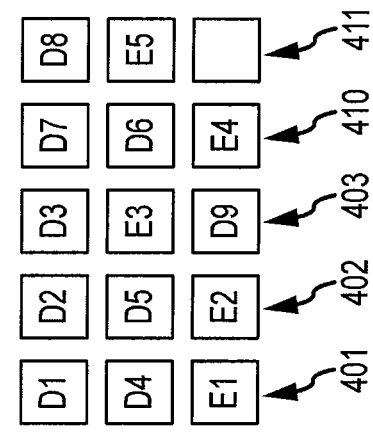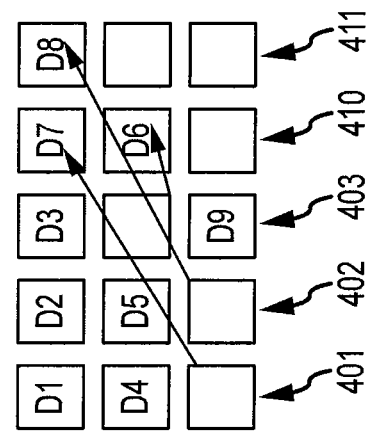

|  612  |  610  |  602  |  604  |  606  |
|---|---|---|---|---|
| LEVEL-3 |  |  |  | DISK1 |
| DISK1 |  |  |  | DISK2 |
| LEVEL-3 | LEVEL-2 | LEVEL-2 | DISK | DISK3 |
| DISK2 | DISK | DISK1 | ARRAY | DISK4 |
| LEVEL-3 | ARRAY |  |  | DISK5 |
| DISK3 |  |  |  | DISK6 |

STORAGE SYSTEM HAVING CROSS NODE DATA REDUNDANCY AND METHOD AND COMPUTER READABLE MEDIUM FOR SAME

TECHNICAL FIELD

Embodiments of the invention relate to disk arrays, and to methods, devices, systems, and computer readable media for storing data and managing disk arrays.

BACKGROUND

Many applications, including video surveillance applications, generate significant amounts of data which may be stored on hard disk drives in computer systems. For larger scale installations, hardware fault tolerance may be built into the system so that recording will not be interrupted on hardware failure.

To protect against disk drive failures, one conventional method is to keep a copy of the data on two separate disk drives. In the event of a failure of one disk drive, the data may be recovered from the other drive. In another conventional method, it may be more cost effective to keep parity information of data distributed among a group of disk drives. Parity information generally refers to a smaller amount of data representing a larger data set. In the event of a failure of one disk drive, the parity data from the remaining drives may be used to reconstruct the lost data. Similarly, to protect against whole enclosure of drives failing, in another conventional method it may be more cost effective to distribute parity information amongst drives grouped in multiple enclosures rather than restricting parity information to a group of drives housed in a single enclosure.

Traditional redundant data storage schemes or architectures built on commodity hardware, such as Redundant Array of Independent Disks or RAID, implement non-distributed RAID; that is each node can apply RAID only to the physical disks it directly owns. Distributed RAID may be used; where each node participates in RAID so as to distribute parity information across the disks of many nodes. Unfortunately, in a distributed RAID system all RAID operation becomes subject to network traffic and therefore may undesirably affect the performance of the system. For example, a disk failure is handled by rebuilding over the network, which may require on the order of 10*2 TB of data movement. Moving this much data over a network may be time consuming and may adversely affect system performance.

To protect against disk access system component system failures, one conventional method is to split the compute and storage components of the system into separate physical machines, and provide redundant data-paths to connect the compute nodes to the storage nodes. This method utilizes dual-port disk drives and dual disk controllers in the storage enclosure. Accordingly, the disk drives have redundant lanes and interconnects, and multiple controllers are provided. Unfortunately, redundant data-path systems may not be cost effective for applications such as video surveillance.

BRIEF DESCRIPTION OF THE DRAWINGS

FIGS. 4A-D are schematic illustrations of data storage in an original 3 node system during following the addition of 2 nodes.

FIG. 6 is a schematic illustration of a graphical user interface showing relationships between objects in different levels.

DETAILED DESCRIPTION

Figure 1:
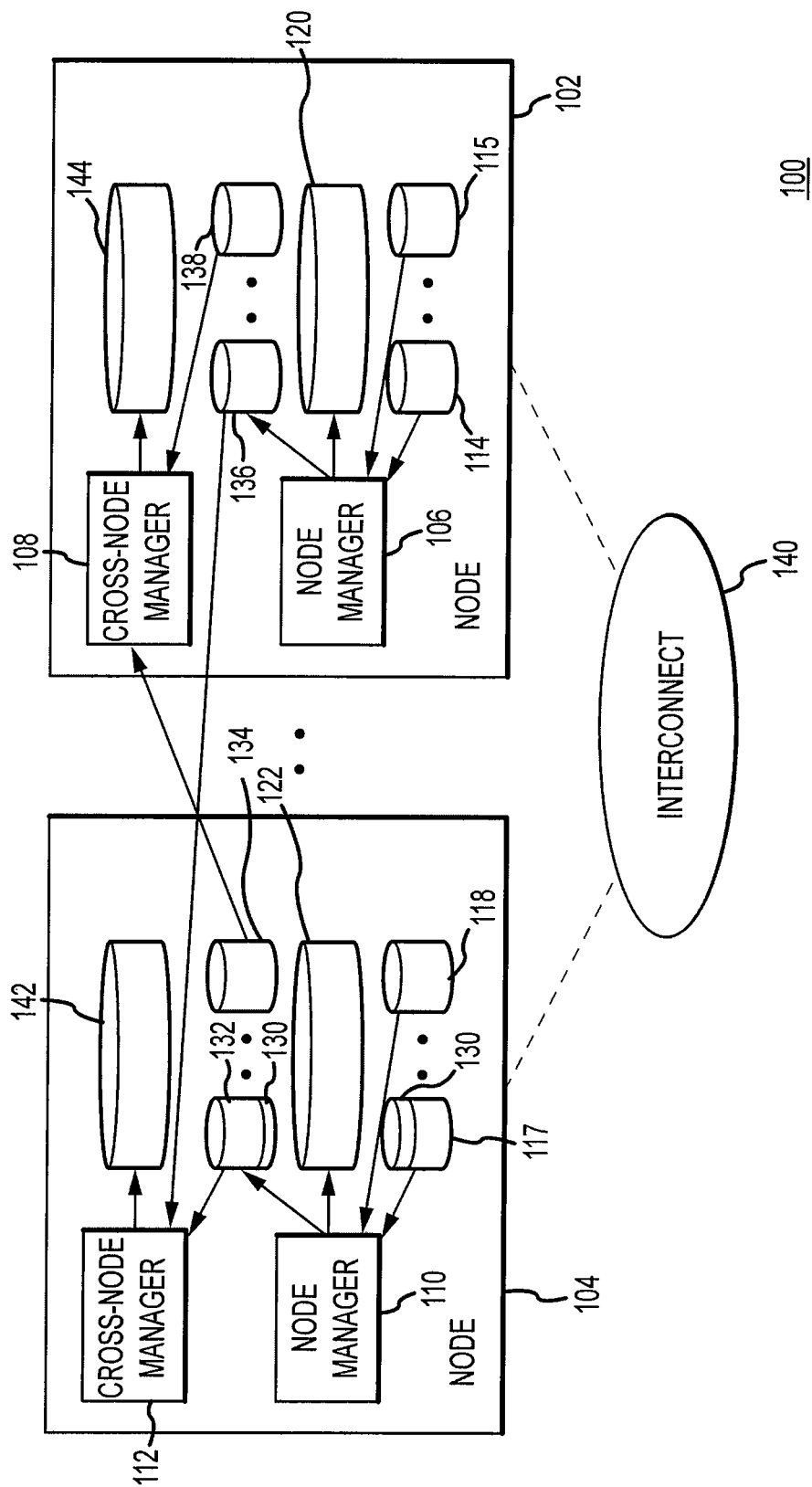
FIG. 1 is a schematic illustration of a storage system arranged in accordance with embodiments of the present invention.

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, electronic components, and software operations have not been shown for simplicity.

Embodiments of the invention may provide low cost, fault tolerant and scalable computer systems suitable for video surveillance applications to record and store video data. Mechanisms to provide fault tolerance may advantageously be cost effective to keep the surveillance system cost low. Other types of applications may be implemented and other types of data may be stored using systems and techniques described herein.

Generally, applications and systems described below refer to the availability of redundant data. As generally described above, the actual data may not be duplicated in some embodiments, but parity data representative of the data may be used.

Embodiments of the present invention generally provide for multi-dimensional disk arrays and methods for managing same. By multi-dimensional, it is meant that multiple levels of disk arrays may be created at each level of a system where failure is to be protected against. For example, as will be described below, a set of physical disk drives may be arranged into a first level disk array. A failure of a drive in the physical disk drives may be protected against using data stored on the remaining disk drives. The collection of physical disk drives, along with processing unit(s), memory, and a network connection, may be referred to as a node. Accordingly, the first level disk array may protect against failure within the node. Communication between nodes may then not be necessary to restore the system after a disk failure. A second level disk array may be generated using portions of the physical disk drives located at multiple nodes. In this manner, the effects of failure of a node may be protected against using data stored at other nodes and managed through the second level disk array. Additional levels may also be implemented, for example a third level disk array may be generated using portions of physical disk drives located at multiple geographical sites. Each site may include any number of serves having a plurality of disk drives. Failure of a site may be protected against using data stored at other sites and managed through the third level disk array.

Embodiments of the invention accordingly allow disk failures to be handled as close to the disks as possible, using no or limited network resources. Handling reliable storage scalability, however, may require distributed RAID. Accordingly, embodiments of the invention provide RAID at multiple and different levels, called here multi-dimensional RAID.

Recall, as described in the Background section above, that some existing systems may separate compute and storage nodes and require multiple data-paths between the nodes. Embodiments of the present invention may utilize single-port disk drives in the compute node, with system component failure handling moved to the node level. The resulting system may have lower failure-mode performance, but may significantly reduce the cost of the storage component of the system. Embodiments may provide adequate performance for surveillance or other systems while keeping system cost low. While multi-port drives may be used in some examples, they may be redundant in some embodiments.

A variety of difficulties may be encountered in building a multi-dimensional disk array system using integrated server-storage nodes. Embodiments of the present invention may overcome some or all of the below-described difficulties. The difficulties are presented to facilitate understanding of described embodiments. Not all, or even any, of the listed difficulties may be overcome or addressed by every embodiment of the present invention. Difficulties described below include difficulties involved in system expansion, hierarchical viewing, and array rebuild time.

When a new disk is added to a system, the new disk may not be able to immediately contribute to the disk array. The data on the existing disk array may be rearranged to spread across the existing disks and new disk. For a multi-dimensional disk array, this data rearrangement process may compound for every dimension. The process may be very time consuming. Alternatively, a new array may be created to match the desired disk array configuration, and the data from the old array may be copied to the new array. This may require at least doubling the storage space, which may not be practical for a large multi-dimensional disk array.

In each level of a multi-dimensional disk array, storage objects are sub-divided.

The storage objects may then be interleaved and rearranged at the next level, to create different fault boundaries to provide fault tolerance. When a failure occurs to one particular storage object in a specific level of the multi-dimensional array, it may be difficult to assess the impact to objects in all the other levels. Also, given a particular storage object, it may be difficult to identify other objects in the array with similar fault tolerance and performance characteristics.

In a multi-dimensional disk array, if any level of the array encounters a failure in one of its elements, all the elements at the same level in the array may need to be accessed to rebuild data for the failed element. This may lead to I/O load on all the storage objects in all the levels below it. If the whole level of the array is to be rebuilt indiscriminately, the performance impact and rebuild time may be intolerable. Also, for multi-dimensional arrays, transient failure where the array element returns to good working condition after brief interruption may be more common than permanent failure. Indiscriminately rebuilding the whole level of any array may often be unnecessary.

Embodiments of the present invention may provide software and hardware structures used to build cost-effective, scalable and fault-tolerant multi-dimensional disk arrays. One or more of the following mechanisms may be used to make such a product deployable and manageable:

1) Online copying of selective disks in the existing disk array may be used to achieve rapid migration of existing data to newly available disks. This may allow the system to create new arrays with layouts that incorporate the new disks, resulting in arrays with optimized performance and fault-tolerance characteristics.

2) A table-based storage object display construct may be provided for quick identification of parent-child object relationship from the top to the bottom levels, and peer-to-peer object relationship across the whole system.

3) During the time an array element is missing, a data modification tracking mechanism may be activated. When the array element returns, the extent of the array rebuilding is determined according to the amount of data modification has happened.

Again, not all embodiments of the present invention will utilize each, or any, of these mechanisms. Embodiments of the present invention will now be described further below with reference to the Figures.

FIG. 1 is a schematic illustration of a storage system arranged in accordance with embodiments of the present invention. The storage system 100 includes node 102 and node 104. While two nodes are shown, any number may be provided. Each node, including the nodes 102, 104, may include an aggregation of combined compute and storage subsystems. That is, each node, including the nodes 102, 104, may include processing power, such as one or more processing units (not explicitly shown in FIG. 1). A processing unit may be implemented, for example, as a processor. The processing unit(s) of each node may be configured to run multiple software modules simultaneously. Each node, including the nodes 102, 104 may include memory coupled to the processing unit(s) and encoding executable instructions which, when executed by the processing units, cause the processing unit(s) to perform the actions and data transformations described below as a 'cross-node manager' or 'node manager'.

For example, the node 102 includes a node manager 106 and a cross-node manager 108. The node manager 106 may include one or more processing units and memory encoding computer readable instructions that when executed, cause the node manager 106 to provide the functions described below. The cross-node manager 108 may include one or more processing units, which may be shared with the node manager 106, and memory encoding computer readable instructions, which may be shared with the node manager 106, that when executed, cause the cross-node manager 108 to provide the functions described below. The node 104 includes a node manager 110 and a cross-node manager 112. The node manager 110 may include one or more processing units and memory encoding computer readable instructions that when executed, cause the node manager 110 to provide the functions described below. The cross-node manager 112 may include one or more processing units, which may be shared with the node manager 110, and memory encoding computer readable instructions, which may be shared with the node manager 110, that when executed, cause the cross-node manager 112 to provide the functions described below. Although not shown explicitly in FIG. 1, each node including the nodes 102, 104 may be in communication with input and/or output devices such as, but not limited to, one or more displays, keyboards, mice, or network connections.

Each node may also have direct access to a number of single-port disk drives, where video or other data may be stored. The node 102 includes disk drives 114, 115, and any number of disk drives may be provided. The node 104 includes disk drives 117, 118, and any number of disk drives may be provided. The disk drives in a node may be arranged into one or more disk arrays, as will be described further below.

Each node, including the nodes 102 and 104, may include a first level disk array.

The node 102 includes the first level disk array 120. The node 104 includes the first level disk array 122. The first level disk arrays 120, 122 are specific to the respective node 102, 104, and may group multiple physical disk drives of the node into an array having redundant data storage, such as RAID. That is, the first level disk arrays 120, 122 represent an arrangement of redundant data storage on the physical disk drives of the node. The first level disk arrays may be created and managed by the respective node manager. For example, the node manager 106 of the node 102 may arrange the disk drives of the node 102, including the drives 114 and 115, into the first level disk array 120. The first level disk array 120 is a representation of redundant storage on the disk drives, such that if one disk drive were to fail, the node manager 106 may recover data stored on the failed drive using data stored on others of the drives within the first level disk array. Similarly, the node manager 110 of the node 104 may arrange the disk drives of the node 104, including the drives 117 and 118, into the first level disk array 122. The first level disk array 122 is a representation of redundant storage on the disk drives, such that if one disk drive were to fail, the node manager 110 may recover data stored on the failed drive using data stored on others of the drives within the first level disk array. The node managers 106, 110, may provide protection of disk drive failures in a first level disk array using distributed parity redundancy mechanism, for example RAID5 or RAID6. If disk drive fault-tolerance is not needed, the node managers 106, 110 may stripe the data across the disk drives of the respective first level disk array, for example RAID0. That is, a data layout across the disk drives of the respective first level disk array may be in accordance with a RAID0 architecture.

The node managers 106, 110 may also subdivide the combined storage capacity of the respective first level disk array 120, 122 into storage objects, referred to herein as level-2 disks. That is, the node managers 106, 110 may make portions of the physical disk drives of the node, for example disk drives 114, 115 or 117, 118, available to a next level in groupings referred to as 'level-2 disks'. For example, the node manager 110 may make a portion 130 of the disk drive 117 available as a portion of a level-2 disk 132. Other portions of other disks in the disk array 122, e.g. Disk 118, may also be used to form the level-2 disk 132. Other portions of the disks of the disk drives of the node 104 may be used by the node manager 110 to provide other level-2 disks, including the level-2 disk 134. In an analogous manner, the node manager 106 may provide level-2 disks 136, 138 using portions of the physical disks of the node 102, such as the disks 114, 115. Although two level-2 disks are explicitly shown in each node of FIG. 1, any number may be provided. These level-2 disks, including the level-2 disks 132, 134, 136, 138 may be used to implement redundant storage schemes capable of data recovery following the failure of a node, as will be described further below.

In embodiments of the present invention, multiple nodes may be connected over an interconnect. The nodes 102 and 104 of FIG. 1, for example, are connected over an interconnect 140. The interconnect 140 may be implemented as any type of communications connection, such as a wired or wireless network. For example the interconnect 140 may be implemented as an Ethernet switch or fiber channel. The node managers 106, 110, may expose their respective level-2 disks over the interconnect 140, so that the level-2 disks may be accessible by other nodes.

Each node, including the nodes 102, 104, as mentioned above, also includes a respective cross-node manager 108, 112. The cross-node managers 108, 112 may combine level-2 disks from different nodes into another array. For example, the cross-node manager 112 may create a level-2 disk array 142 using the level-2 disk 132 from the node 104 and the level-2 disk 136 from the node 102. The cross-node manager 112 may store data in the level-2 disk array 142 using a redundancy mechanism such as a distributed parity redundancy mechanism, for example RAID5 or RAID6. Similarly, the cross-node manager 108 may create a level-2 disk array 144 using the level-2 disk 138 and the level-2 disk 134. The cross-node managers 112 and 108 may then reconstruct data following the failure of a node, using data stored on level-2 disks in other nodes. Generally, the cross-node managers are configured to create a level-2 disk array using a level-2 disk from each of the nodes in the system. The cross-node managers 108, 112 may also subdivide the combined storage capacity of the level-2 disk arrays 142, 144 into storage objects for a next level (not shown in FIG. 1). Another level of node manager may be provided that may generate respective disk arrays at the next level to provide redundancy on a wider scale, e.g. to protect against failure of an entire geographic site.

Figure 2:
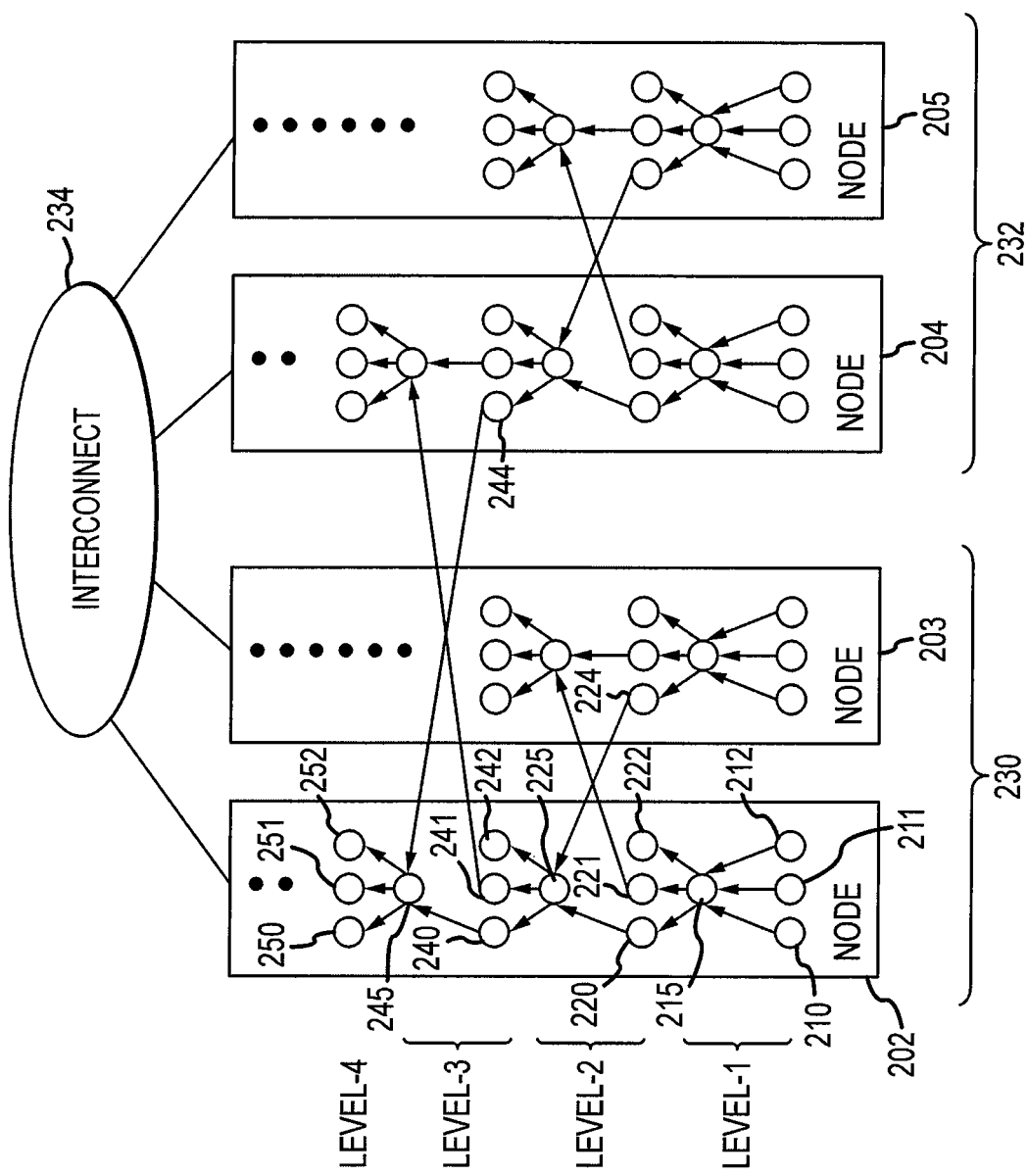
FIG. 2 is a schematic illustration of a plurality of nodes having at least four levels of storage redundancy.

FIG. 2 is a schematic illustration of a plurality of nodes having at least four levels of storage redundancy. Nodes 202-205 are shown, although any number may be used. The nodes 202-205 may be in communication over an interconnect 234. Nodes shown in FIG. 2, may be implemented using nodes described above with FIG. 1. For example, the node 202 may be implemented using the node 102 in some examples. Referring back to FIG. 2, the lowest depicted circles represent physical disks associated with each node. Disks 210-212 for example, represent physical disks associated with the node 202. A node manager (not shown in FIG. 2), may aggregate the physical disks of a respective node into a first level disk array. For example, a node manager for the node 202 may aggregate the disks 210-212 into the first level disk array depicted as element 215. The node manager may also subdivide the first level disk array into multiple subdivisions, described above as level-2 disks. Accordingly, the first level disk array 215 may be subdivided into level-2 disks 220-222. A cross-node manager, described above, may utilize the subdivided portions of the level 1 arrays of multiple nodes to create a level-2 array. For example, the level-2 array 225 of FIG. 2 may be created using the level-2 disk 220 of the node 202 and a level-2 disk 224 of the node 203.

As mentioned above, a third level of disk array may also be provided in some examples to provide redundancy across another level. For example, the nodes 202-205 may be arranged in groups, for example the nodes may be at different sites. The nodes 202-203 may belong to a first group 230, while the nodes 204-205 may belong to a second group 232. This may represent different geographic locations in some embodiments. Another level node manager may be provided at each group to subdivide the level-2 array into level-3 disks. For example, a cross-site manager may be provided at the node 202 to subdivide the array 225 into level-3 disks 240-242. The cross-site manager may generate a level-3 array 245 using the level-3 disk 240 of the node 202 and a level-3 disk 244 of the node 204. In this manner, redundancy across groups may be provided. In an analogous manner, a fourth level of manager may be provided to sub-divide the level-3 array 245 into level-4 disks 250-252. This fourth level manager may generate a level-4 array (not shown in FIG. 2) that may provide redundancy across another type of grouping, e.g. across geographic regions in one example, to recover following a failure at that level.

Figure 3:
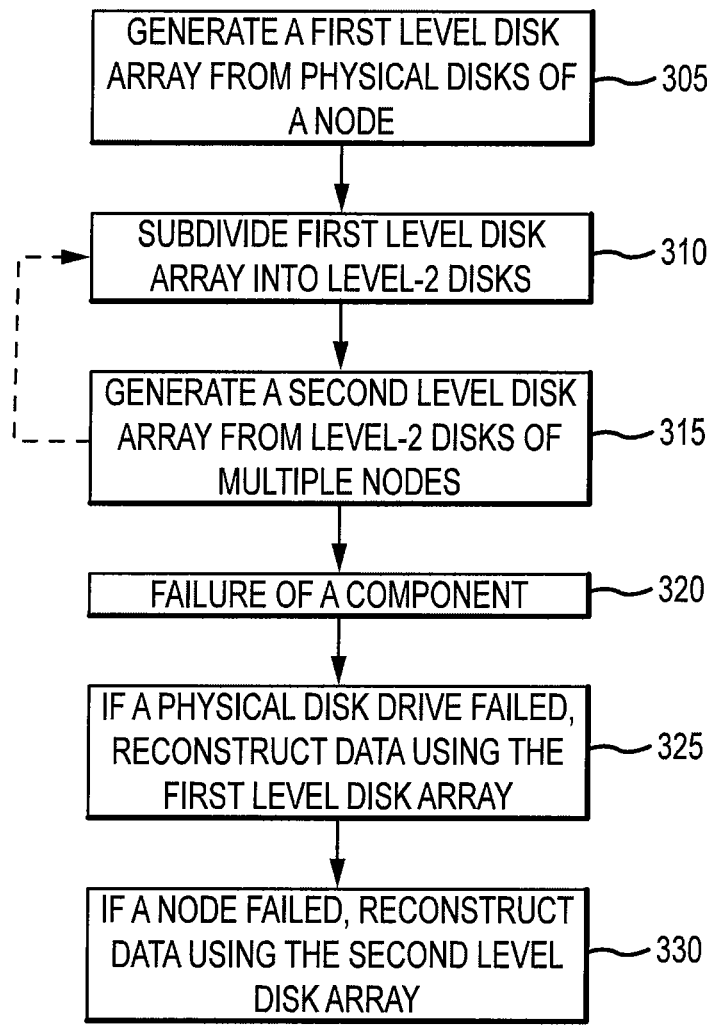
FIG. 3 is a flowchart of a method of creating a multi-dimensional disk array and recovering from failure in accordance with an embodiment of the present invention.

During operation, the described managers may generate the multi-dimensional disk arrays described above. Following a failure, the appropriate level manager may recover the data previously stored at the failed component using data stored at the remaining operational components. FIG. 3 is a flowchart of a method 300 of creating a multi-dimensional disk array and recovering from failure in accordance with an embodiment of the present invention. In step 305, a node manager may generate a first level disk array from physical disks of a node. Generating a first level disk array may include providing a redundant storage scheme, e.g. RAID1, RAID5, or RAID6 across the physical disks. Alternatively, a first level disk array may employ a storage scheme that provides performance aggregation only, e.g. RAID0. Step 305 may be performed by node managers at multiple nodes, as has been described above.

In step 310, the node manager may subdivide the first level disk array into level-2 disks. Node managers at each of multiple nodes may perform step 310. In this manner, portions of the physical disks are made available as level-2 disks. In step 315, a cross-node manager may generate a second level disk array from level-2 disks of multiple nodes. The cross-node manager of multiple nodes may generate respective second level disk arrays in step 315. The steps 310 and 315 may then be repeated for higher levels of disk arrays, as has been described above, as generally indicated by the dotted line in FIG. 3.

Failure of a component may occur at step 320. The failure of a component may be a permanent failure, such as destruction through a natural disaster, theft, or other permanently disabling occurrence, or a temporary failure, such as a temporary loss of connectivity with the component. The component may be a single disk drive, a node, a site, or another general grouping. In step 325, if a physical disk drive failed, a node manager may reconstruct the lost data using a first level disk array. The node manager may reconstruct the data of the disk array from the distributed parity among the drives of that node. In step 330, if a node failed, a cross-node manager may reconstruct the lost data using a second level disk array. The cross-node manager may reconstruct the data of the second level disk array from the distributed parity among the nodes. Other steps may also be provided for higher level managers to reconstruct lost data using higher level disk arrays. In this manner, data availability may be achieved on all kinds of single faults, without necessarily having full copies of disk data or dual data-path access to the disks.

While a two level disk array has generally been shown and described above, more levels may be used. Each level may include another manager performing analogous work of the node manager and the cross-node manager. For ease of implementation and better software failure boundaries, each manager may be implemented as an independent virtual machine in node running a hypervisor. In such a software only implementation, each level may be turned on or off to achieve desired combination of performance, cost effectiveness and fault-tolerance. In some examples, a single system may have storage objects with different levels of dimensions coexisting. This may be useful to provide greater fault-tolerance for some objects, while sharing the same hardware with other storage objects having lower fault-tolerance.

Structure and functionalities will now be described that may be used in embodiments of the present invention to address the difficulties described above. While headings are used for ease of reading, it is to be understood that the headings are not intended to limiting, and are not intended to refer to the only place in this document where information regarding the heading may be found.

In a parity protected disk array with N elements, adding a new disk to form an N+1 element disk array may require reading all the data off the original disk array and rewriting them onto a new disk array. It may be a very time consuming process. A straightforward implementation would require twice the amount of disk drives to provide space for of the new array during the copying. In embodiments of the present invention, adding a node to the system may not provide enough additional disk space to perform the copying. For example, referring back to FIG. 1, if a new node were added to the system 100, there may not be sufficient disk space to read all the level-2 data off of all level-2 disks and generate new level-2 arrays across the three nodes. New disk drives would need to be added to each existing node, and the new node would need a matching number of disk drives, both of which may be cost prohibitive in some examples.

Accordingly, in embodiments of the present invention, rather than changing the N-elements disk array to an N+1 element disk array, the storage space from the disks of the newly available node may be distributed among all the nodes. After the space redistribution, new disk arrays may be created that are N+1 element wide. FIGS. 4A-D are schematic illustrations of data storage in an original 3 node system during and following the addition of 2 nodes. In FIG. 4A, data elements, labeled D1-D9, are arranged on three nodes, nodes 401-403. Any of the nodes 401-403 may be implemented, for example, using the nodes 102 or 104 of FIG. 1. The individual data elements D1-D9 are stored across the nodes in accordance with the actions of a cross-node manager, as described above.

FIG. 4B is a schematic illustration of the data storage system of FIG. 4A following the addition of two nodes. The data elements D1-D9 remain stored on the nodes 401-403 as in FIG. 4A. The new nodes 410 and 411 have available storage capacity. Following addition of nodes to a system, the cross-node manager or other software capability may identify portions of stored data that may be migrated to the new nodes. FIG. 4C is a schematic illustration of the data elements D1-D9 having portions migrated to the new nodes 410 and 411. As shown, data elements D6, D7, and D8 have been migrated to the nodes 410 and 411. FIG. 4D is a schematic illustration of the data elements D1-D9 stored along with additional data elements. Following the addition of nodes, new data may be written to the system using the wider array format. In FIG. 4D, new data elements E1-E5 are shown stored among the nodes.

Figure 5:
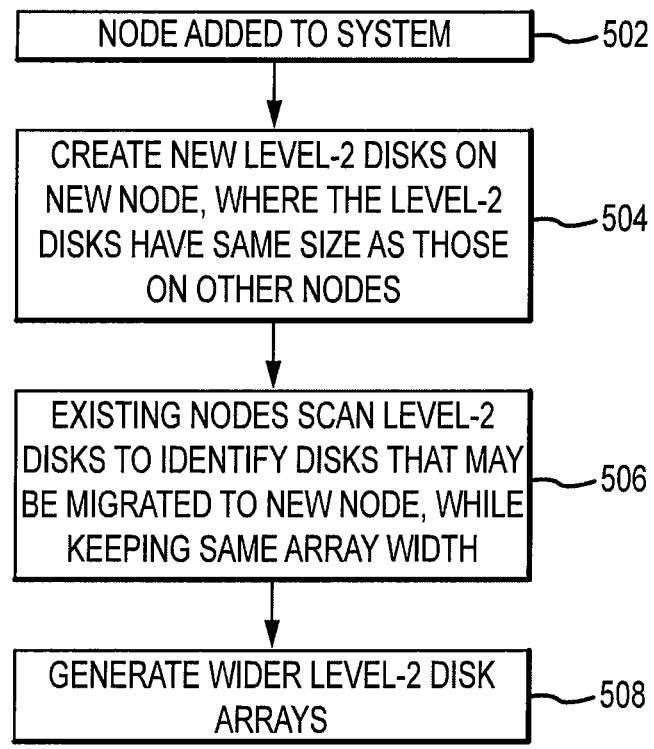
FIG. 5 is a flowchart illustrating a method of adding capacity to a level-2 disk array in accordance with an embodiment of the present invention.

FIG. 5 is a flowchart illustrating a method of adding capacity to a level-2 disk array in accordance with an embodiment of the present invention. The method 500 at step 502 may include adding a node to a system. Any number of nodes may be added for any reason, for example to increase the overall storage capacity of the system. In step 504, new level-2 disks may be created on the new node. Recall, as described above, that a node manager of the new node may subdivide a disk array into level-2 disks. The level-2 disks created on the new node should have a same size as the level-2 disks available on other nodes in the system.

In step 506, existing nodes may scan their level-2 disks to identify disks that may be migrated to the new node, while keeping a same array width. The scanning may be performed by the cross-node managers in the nodes, which have been described above. Recall the cross-node managers may have created level-2 disk arrays having a particular width. The cross-node managers may now identify, based on the data stored on individual level-2 disks, particular level-2 disks which may be migrated to the new node without disrupting the width of the array.

The cross-node managers may then migrate the identified disks. To transfer the targeted level-2 disks' data on existing nodes to the new level-2 disk on the new node, the standard RAID arrangement may be augmented with a new construct, called a mirrored array element. User access to the original level-2 disk may first be suspended by the cross-node manager. Then, in an atomic operation, a mirrored level-2 disk may be created, by the cooperation of the original node's cross-node manager and the new node's cross-node manager, with the original level-2 disk and the new level-2 disk. User access may then be resumed. Synchronization between the two level-2 disks in the mirror may be performed in the background, while new user write access may be updated on both members of the mirrored level-2 disk. When the synchronization operations completes, user access may be suspended by the cross-node manager, and in an atomic operation, the mirrored level-2 disk may be replaced with the new level-2 disk. Using this approach, the data may be generated on the new level-2 disk in a series of one-read one-write operations, instead of a series of N-read one-write operations, which may significantly reduce the disk load of the system during the process.

Referring again to FIG. 5, in step 508 the cross-node managers of all nodes may generate level-2 disk arrays having a new width including the added node or nodes. In this manner, data stored before the node addition may be stored in N wide disk arrays, while data stored after the node addition may be stored in N+1 wide disk arrays.

As was described above, at every level of a multi-dimensional array, the total storage capacity managed in a node at one level may be sub-divided. The next level may take storage objects from the different nodes and reassemble them to create a next level array. One advantage of doing this may be that the next level array will have better fault-tolerance characteristics than the original array.

At each level in the multi-dimensional disk array, there is a one-to-many mapping between the n-th level disk array and the n+1-th level disk, and a many-to-one mapping between the n+1-th level disk and the n+1-th level disk array. As a result, given a particular object in a level, the relation of all the objects between adjacent levels can be displayed in a table format.

FIG. 6 is a schematic illustration of a graphical user interface showing parent-child relationships between objects in multiple levels, from the lowest level disk to the highest level disk array. The graphical user interface 600 may be displayed, for example, on a display device that may be in communication with the nodes in a storage system, for example, the nodes 102 and 104 of FIG. 1. FIG. 6 illustrates the relationship between objects associated with a level-2 disk, disk1. Accordingly level-2, disk1 is shown in the center region 602. The particular disk to be analyzed may be selected, for example, by a user, and the user interface 600 may be generated by one or more processing unit(s) in accordance with executable instructions for generating the user interface 600 that may be stored in computer readable media accessible by the processing unit(s).

An area 604 adjacent the region 602 is provided to illustrate which array is the next lower level array, accordingly, a first level disk array is shown, labeled simply 'disk array' in FIG. 6. In an area 606 adjacent the area 604, the disks within the first level array which were used to make up the selected level-2 disk in the region 602 are shown. Looking at the region 606, it can be seen that disk1 of the level-2 array is associated with disks 1-6 of the first level array.

The area 610 displays a label for the disk array to which the selected disk in the area 602 belongs, a level-2 disk array in the example of FIG. 6. The area 612 displays disks within the next higher disk array which utilize portions of the selected level-2 disk in the area 602. As shown in FIG. 6, disk1 of the level-2 array is associated with disks 1-3 which will be used to form separate level 3 arrays.

Graphical user interfaces described herein, including the interface 600 shown in FIG. 6, may be implemented in any of a variety of ways. In one example, a web server may be running in one or more of the cross-node managers described above. The web server may gather the described relationship data and may communicate that relationship data to, for example, a web browser which may access the web server remotely. The display of FIG. 6 may then be displayed on a display or other output device.

Figure 7:
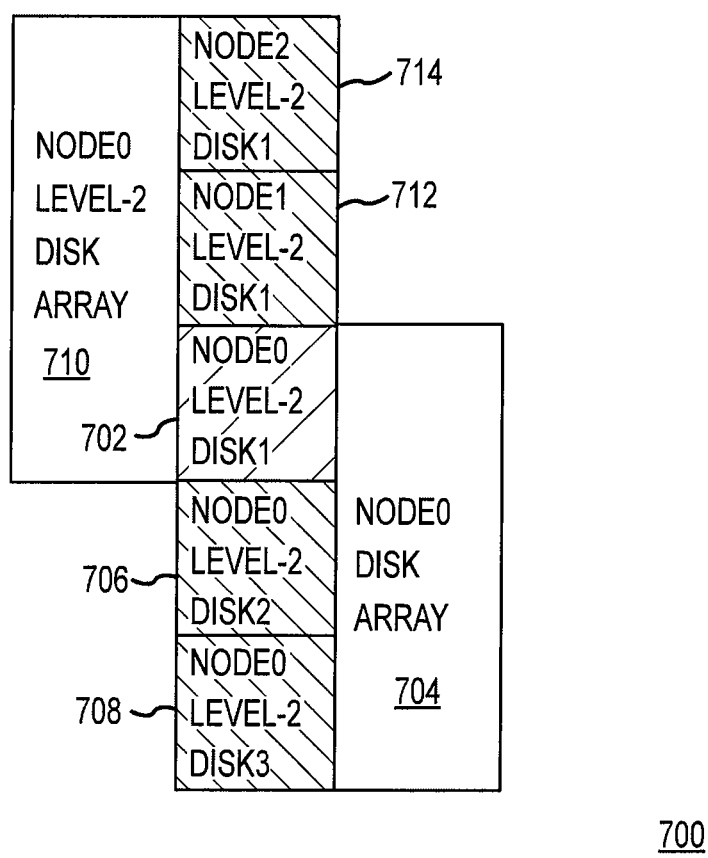
FIG. 7 is a schematic illustration of another embodiment of a graphical user interface according to the present invention.

FIG. 7 is a schematic illustration of another user interface according to an embodiment of the present invention. This graphical user interface 700 may be provided so that when an administrator of the system selects a particular storage object, the user interface may display the parent-child relations between the disk and disk array of one level towards the top and one level towards the bottom. The group of relations may be used to build a table that illustrates all the disks that belongs to the same disk array in the same level and all the disks that comes from the same disk array at one lower level. So, for example, in FIG. 7, disk 1 on the level-2 disk array at node0 has been selected, as shown in region 702.

Cross-node managers or other processing unit(s) at the nodes may receive an indication of the selected disk, and may gather the remaining information shown in FIG. 7. Area 704 provides a graphical indication of disks in the first level disk array that are associated with the selected disk shown in 702. The associated disks are listed in areas 706 and 708. As shown in areas 702, 706, and 708, disk2 of the level-2 disk array at node0 and disk3 of the level-2 disk array at node0, combine with the selected disk to form the node0 disk array.

Area 710 provides a graphical indication of disks in a second level disk array that are associated with the selected disk shown in 702. The associated disks are listed in areas 712 and 714. As shown in areas 702, 712, and 714, disk1 of the level-2 disk array at node1 and disk1 of the level-2 disk array at node2 combine with the selected disk to form the level-2 disk array at node0.

Using these graphical interfaces, a user may readily identify the association between disks and arrays. In this manner, in the event of a disk failure or performance problem, corrective action may be taken, such as but not limited to, replacing a disk or adjusting system load, based in part on the information conveyed by one or more of the above-described graphical user interfaces.

In a multi-dimensional disk array, the array elements may have different failure characteristics than a single level disk array where the elements are physical disk drives. Physical disk drive failures may be usually mechanical and usually permanent; the disk drive data may then need to be regenerated and rebuilt for the whole disk drive. For the higher level disk array elements, failures may be of a more loss-of-access type, due to software failure or connectivity problems. Loss-of-access failures may be transient and the element may be totally functional after a recovery action or reboot. During the loss-of-access, if there are no write access to a particular portion of the disk array, rebuilding that portion may be a wasteful operation. Rebuild operations in a higher level disk array may also put more strain on the system because the operation has to perform globally across multiple nodes over the interconnect.

Figure 8:
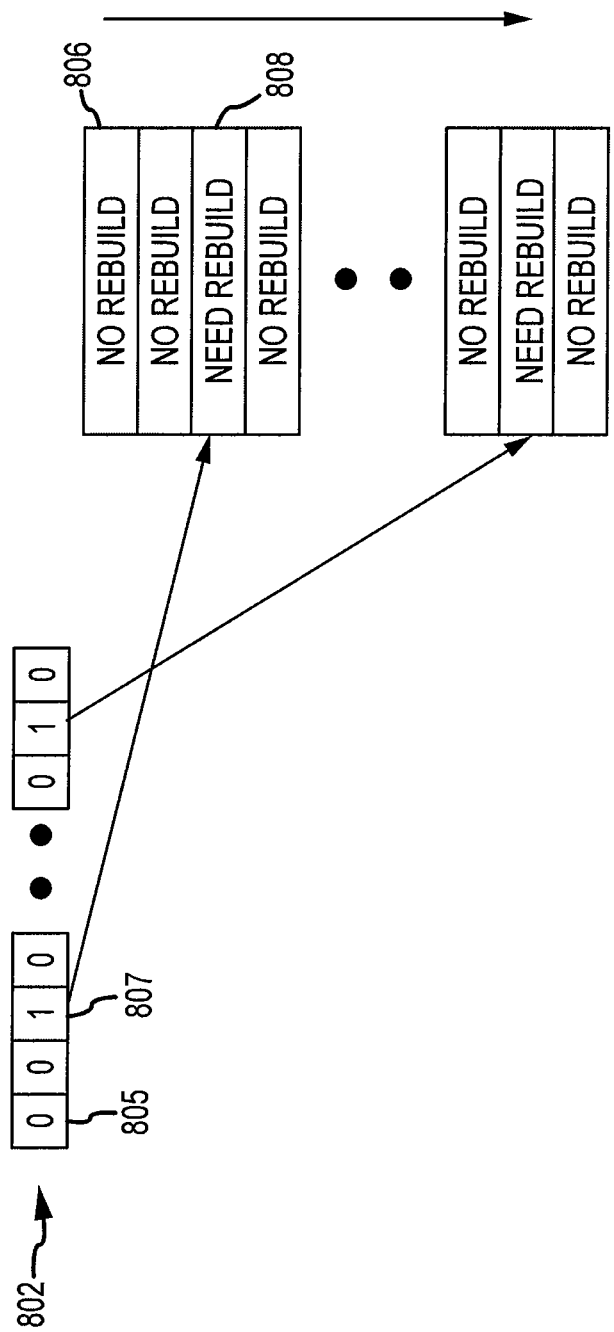
FIG. 8 is a schematic illustration of a rebuilding progression that includes a bitmap arranged in accordance with embodiments of the present invention.

FIG. 8 is a schematic illustration of a rebuilding progression including a bitmap arranged in accordance with embodiments of the present invention. For each disk array, the cross-node manager, described above, may maintain a bitmap, of length 1024 in some embodiments. A bitmap 802 is shown in FIG. 8. Each bit in the bitmap accordingly may represent $\frac{1}{1024}$ of the size of the disk array. A bit set in the bitmap indicates write access has occurred in an associated portion of the disk array while the disk array is in a degraded state, for example is unavailable. That is, during a time a disk is unavailable, the cross-node manager may set a bit corresponding to each location of the unavailable disk where a write occurs. The write may be completed by sending data to another location during the time the disk is unavailable.

When the unavailable disk becomes available, the cross-node manager may now access the bitmap 802 to determine which portions of the newly available disk need to be rewritten. The cross-node manager may scan the bitmap 802 from the beginning. If the bitmap entry value is zero, the cross-node manager may skip the represented portion of the disk array and not perform a rebuild of data from parity information. For example, the bitmap entry 805 is 0 and the portion of the disk array 806 may accordingly not be rebuilt. If the bitmap entry value is one, the cross-node manager will perform a rebuild of the represented portion of the disk array. For example, the bitmap entry 807 is one, and the cross-node manager may accordingly rebuild the portion 808 of the array. In this way, for write access that are bunched together, the total extent of the disk array rebuild may be small and may complete within reasonable time and put less strain on the overall system resources. The bitmap may be stored on the disk drives along with metadata describing the disk array.

Figure 9:
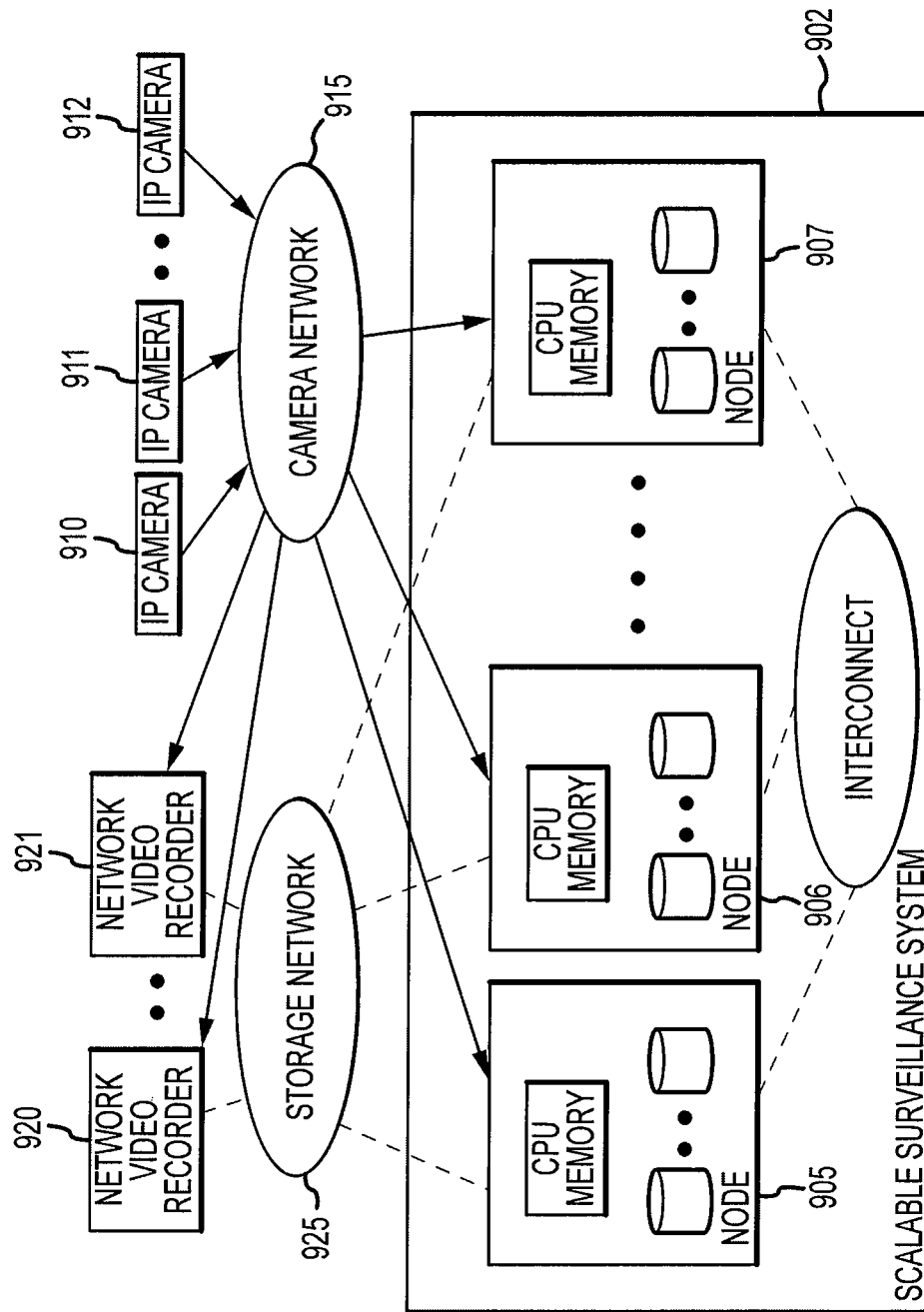
FIG. 9 is a schematic illustration of a system arranged in accordance with embodiments of the present invention.

FIG. 9 is a schematic illustration of a system arranged in accordance with embodiments of the present invention. The system 900 is configured to implement a video surveillance system. A storage system 902 may include multiple nodes, including nodes 905, 906, 907, individual ones of which may be implemented using nodes described and illustrated above with respect to FIG. 1, for example nodes 102, 104. One or more cameras 910, 911, 912 may communicate with the storage system 902 over a camera network 915. Video data may be transferred from the cameras 910, 911, and 912 to the surveillance system 902 over the camera network 915. One or more network video recorders 920, 921 may communicate with the storage system 902 over a storage network 925. Disk data may be transferred between the surveillance system 902 and the video recorders 920 and 921 over the storage network 925. Accordingly, the storage system 902 may be receiving video and/or disk data from cameras and/or video recorders in the system 900.

In some examples, the video recorders, for example 920, 921, may be implemented within one or more of the nodes, and the storage network 925 may not be required. The storage system 902 may be managed as described above, with multiple levels of disk arrays providing redundancy at the node level and at a cross-node level. Additional levels may also be provided. In this manner, failure of a disk or failure of a node may be protected against during real-time video surveillance data capture.

From the foregoing it will be appreciated that, although specific embodiments of the invention have been described herein for purposes of illustration, various modifications may be made without deviating from the spirit and scope of the invention.

The invention claimed is:

1. A method, comprising:
forming a second level disk array based on a plurality of disk drives of a node;
restoring data using the second level disk array responsive to failure of the node receiving an indication of unavailability of a particular disk of the second level disk array; and
rebuilding only portions of a disk array corresponding to certain bits of a bitmap corresponding to locations of the particular disk.

2. The method of claim 1, further comprising providing data redundancy across the plurality of disk drives at a node, wherein the data redundancy includes an architecture selected from the group consisting of RAID5 and RAID6.

3. The method of claim 1, wherein a data layout across the first plurality of disk drives includes a RAID0 architecture.

4. The method of claim 1, wherein the plurality of disk drives and the node are included in a first level disk array, further comprising subdividing the first level disk array of the node into a plurality of level-2 disk drives, and wherein said second level disk array includes a multiple of the plurality of level-2 disk drives of the node.

5. The method of claim 1, further comprising subdividing the second level disk array into a plurality of level-3 disk drives and making the level-3 disks available for providing data redundancy across a geographical site.

6. The method of claim 1, further comprising restoring data using the second level disk array responsive to failure of the node.

7. The method of claim 1, wherein said failure of a node includes temporary unavailability of the node.

8. The method of claim 1, further comprising receiving an indication of an additional node having additional disk drives, scanning the second level disk array to identify selected second level disks of the second level disk array for migration, and migrating the selected disk drives to the additional node using online mirroring and copying.

9. The method of claim 8, wherein the second level disk array has a width, further comprising generating another second level disk array having a width larger than the width of the first-named second level disk array.

10. The method of claim 1, further comprising forming the second level disk array from the first plurality of disk drives of the node and a second plurality of disk drives from another node of the plurality of nodes.

11. The method of claim 1, further comprising receiving an indication of restoration of the particular disk of the second level disk array and scanning the bitmap.

12. A non-transitory computer readable medium comprising instructions that when read by a processor perform:
forming a second level disk array based on a plurality of disk drives of a node;

restoring data using the second level disk array responsive to failure of the node receiving an indication of unavailability of a particular disk of the second level disk array; and rebuilding only portions of a disk array corresponding to certain bits of a bitmap corresponding to locations of the particular disk.

13. The non-transitory computer readable medium of claim 12, further comprising instructions that when read by the processor perform providing data redundancy across the plurality of disk drives at a node, wherein the data redundancy includes an architecture selected from the group consisting of RAID5 and RAID6.

14. The non-transitory computer readable medium of claim 12, wherein a data layout across the first plurality of disk drives includes a RAID0 architecture.

15. The non-transitory computer readable medium of claim 12, further comprising instructions that when read by the processor perform subdividing the first level disk array of the node into a plurality of level-2 disk drives, and wherein said second level disk array includes a multiple of the plurality of level-2 disk drives of the node.

16. The non-transitory computer readable medium of claim 12, further comprising instructions that when read by a processor perform subdividing the second level disk array into a plurality of level-3 disk drives and making the level-3 disks available for providing data redundancy across a geographical site.

17. The non-transitory computer readable medium of claim 12, further comprising instructions that when read by a processor perform restoring data using the second level disk array responsive to failure of the node.

18. The non-transitory computer readable medium of claim 17, wherein said failure of a node includes temporary unavailability of the node.

19. The non-transitory computer readable medium of claim 12, further comprising instructions that when read by a processor perform receiving an indication of an additional node having additional disk drives, scanning the second level disk array to identify selected second level disks of the second level disk array for migration, and migrating the selected disk drives to the additional node using online mirroring and copying.

20. The non-transitory computer readable medium of claim 12, wherein the second level disk array has a width, further comprising generating another second level disk array having a width larger than the width of the first-named second level disk array.

\* \* \* \* \*